Oct. 25, 1966  G. F. LISTER  3,281,110
MOLD FOR PRECAST CONCRETE STEP CONSTRUCTION
Filed Oct. 22, 1965  10 Sheets-Sheet 1

INVENTOR.
GLENN F. LISTER
BY Morton S. Adler
ATTORNEY.

Oct. 25, 1966  G. F. LISTER  3,281,110

MOLD FOR PRECAST CONCRETE STEP CONSTRUCTION

Filed Oct. 22, 1965  10 Sheets-Sheet 4

INVENTOR.
GLENN F. LISTER
BY *Morton S. Adler*
ATTORNEY.

Oct. 25, 1966  G. F. LISTER  3,281,110
MOLD FOR PRECAST CONCRETE STEP CONSTRUCTION
Filed Oct. 22, 1965  10 Sheets-Sheet 8

INVENTOR.
GLENN F. LISTER
BY Morton S. Adler
ATTORNEY.

Oct. 25, 1966 G. F. LISTER 3,281,110
MOLD FOR PRECAST CONCRETE STEP CONSTRUCTION
Filed Oct. 22, 1965 10 Sheets-Sheet 10

INVENTOR.
GLENN F. LISTER
BY Morton S. Adler
ATTORNEY.

United States Patent Office 3,281,110
Patented Oct. 25, 1966

3,281,110
MOLD FOR PRECAST CONCRETE
STEP CONSTRUCTION
Glenn F. Lister, 2221 W. 4th, Waterloo, Iowa
Filed Oct. 22, 1965, Ser. No. 500,602
10 Claims. (Cl. 249—14)

This invention relates to improvements in the art of precasting concrete into a monolithic flight of steps.

In the art of precasting concrete steps as presently practiced, various form components such as inner and outer shells are used and are detachably interlocked in a variety of ways. Such components must be assembled in prescribed manners for the pouring of the concrete and then disassembled for removal of the steps. Many innovations in the art have been disclosed from time to time but as far as can be determined, these are all related to means for expediting and facilitating the assembly and disassembly processes which are generally arduous and time consuming.

It has also been observed that the time and costs involved in handling these various form components is increased when, for example, form sizes must be altered for the purpose of increasing or decreasing the number of steps desired in the finished product. To accomplish this result, it is customary to fabricate the forms so that individual tread and riser sections can be detachably interconnected and the same is true of platform sections which are of variable sizes to produce different size platforms as desired. Very frequently, such interlocking is by bolt and nut means so that it can be appreciated a considerable amount of time and expense can be involved when such adjustments in the forms are required. In addition, and inherent disadvantage in the present practices requiring such assembly and disassembly of forms resides in the fact that seams show up in the finished product where form sections are joined and while this does not affect the product structurally, it detracts from its appearance. In addition, repeated assembly and disassembly of parts with the inevitable wear and tear and not infrequent damage to parts causes difficulties in the proper alignment of form components. Further disadvantages are apparent if all of the multiple connecting points are not adequately tightened and the proper assembly of parts is often adversely affected by the fact that rust forms on edges that must be aligned with other parts.

It is the purpose of this invention to overcome the several disadvantages pointed out herein and accordingly, one of the important objects contemplated by this invention is the provision of a new and improved dolly mounted mold for precast concrete step construction which includes an outer shell in which the treads, risers and platform sections are integrally formed without seams for a predetermined maximum size step unit.

Another object herein is to provide one piece seamless side units for respective opposed sides of the outer shell to form the complete outer shell with such side units being movably mounted relative to said outer shell whereby they can be securely engaged therewith for the pouring of concrete and can be moved outwardly therefrom, without affecting their alignment, for removal of the cast steps.

A further object includes the provision of a one piece integral inner shell or core for complementary use with said outer shell.

A still further object contemplated herein includes the provision of novel means cooperating with said outer shell whereby the number of treads and risers which are cast can be selectively determined within the range of the maximum possible in such shell and which, by reason of the integral shell structure, involves no assembly or disassembly thereof.

Still another object is the provision of means cooperating with said outer shell to vary the size of the platform involved or to eliminate such platform altogether, if desired, without affecting or interferring with the base shell construction itself.

Another object is to provide an improved mold as characterized in which the complete outer shell is removable in one piece after the poured concrete has set sufficiently to permit removal of the forms.

Still further objects herein include improved apparatus for handling and turning the mold as required so to make such operations not only easier but safer and also improved means for securing a vibrating mechanism thereto.

A still further object contemplates the provision of a new and improved dolly which is readily adjustable to facilitate the removal of the mold irrespective of the number of treads and risers which are included in the particular flight of stairs.

To attain these objects and such further objects as may appear herein, or be hereinafter pointed out, reference is made to the accompanying drawings forming a part hereof, in which.

Figures 1, 13:
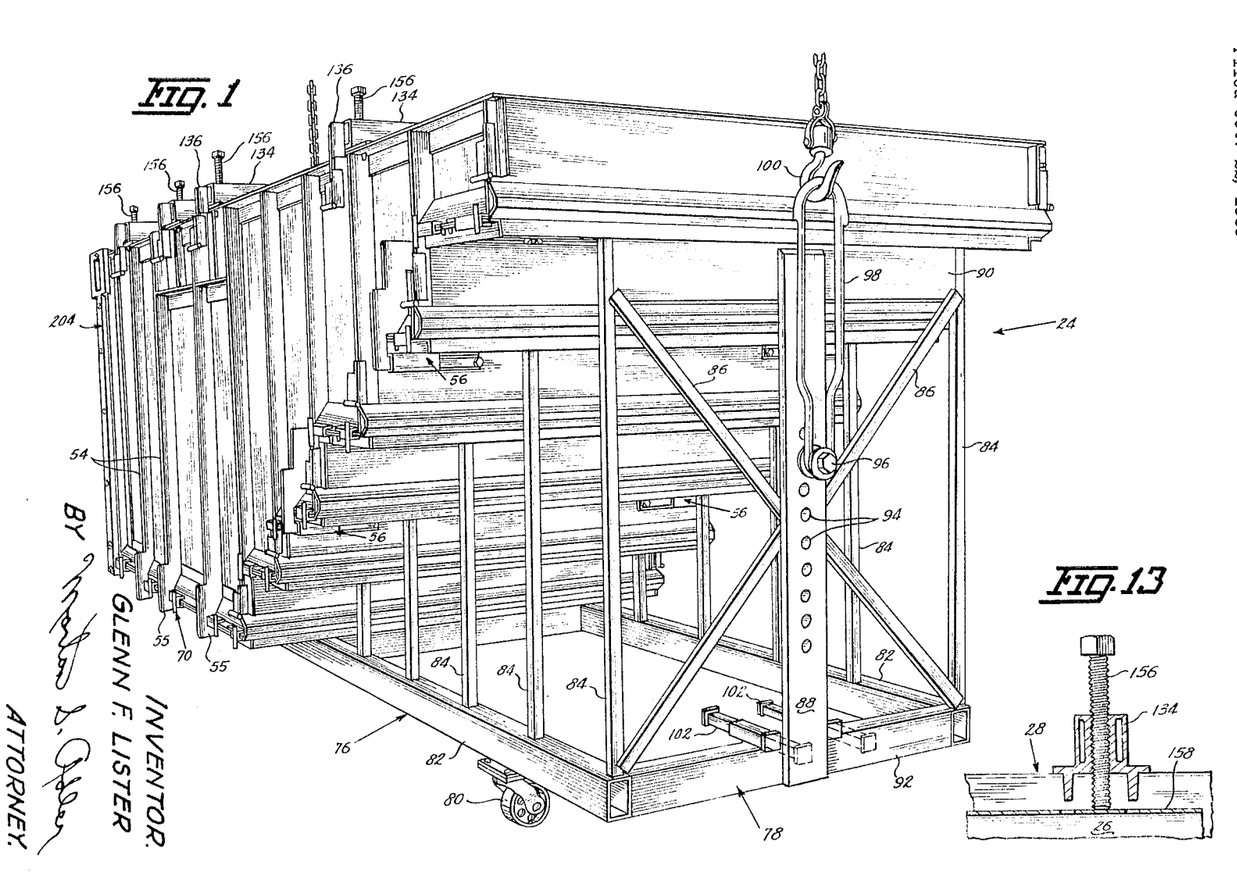
FIG. 1 is a perspective view of the stepped or front end of my new mold shown in position for casting a flight of steps in inverted position.
FIG. 13 is a cross sectional view taken on the line 13—13 of FIG. 2.
Figure 2:
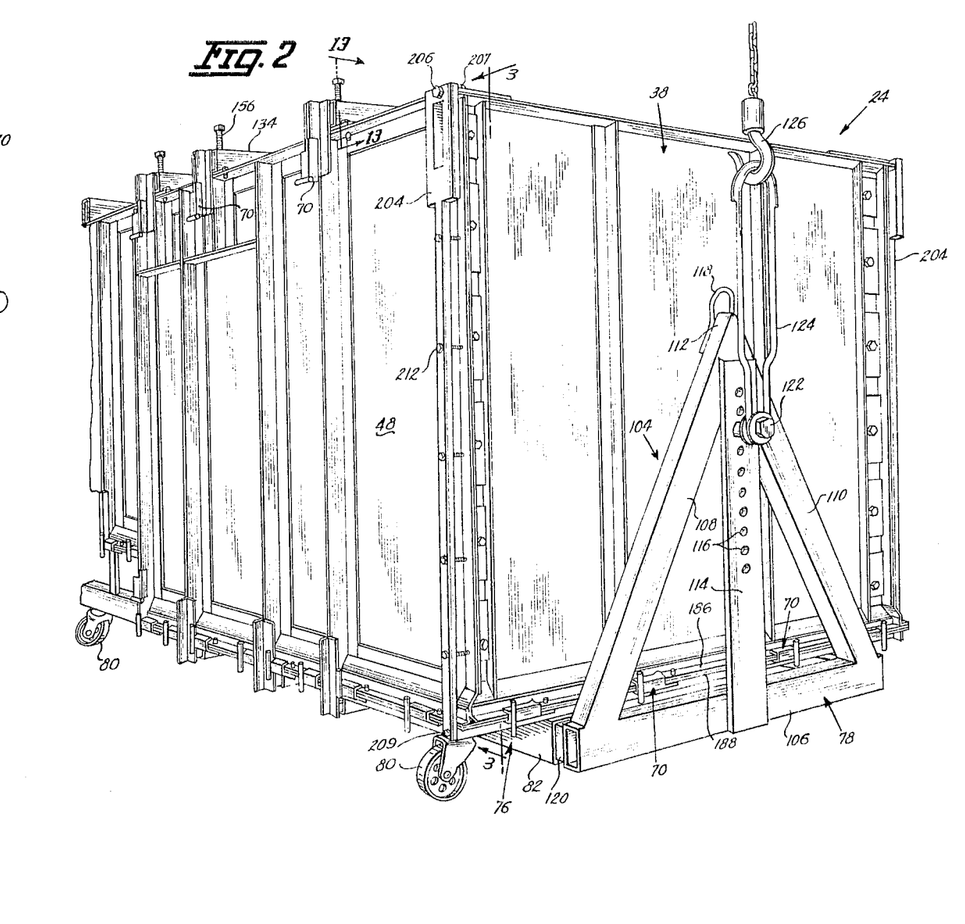
FIG. 2 is a perspective view of this mold from the opposite end or rear relative to that shown in FIG. 1, and illustrating a full back gate for step structures formed with a completely closed rear end.
Figures 3, 4:
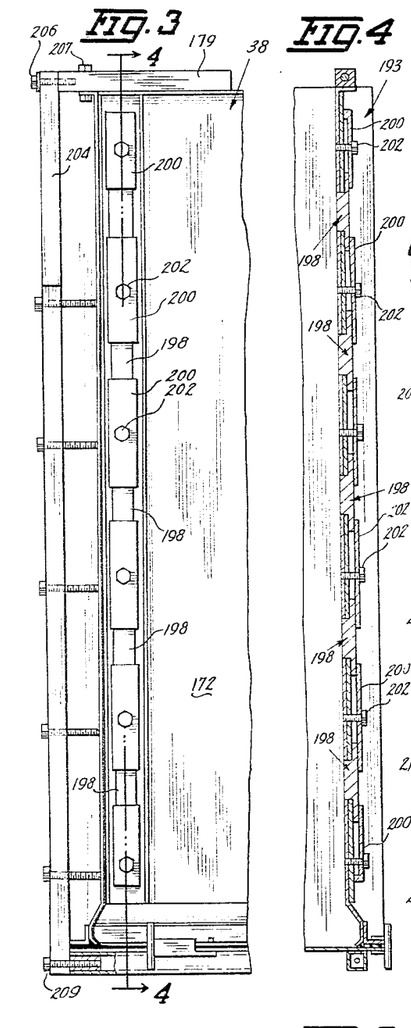
FIG. 3 is an enlarged elevational view taken from the line 3—3 of FIG. 2 to more clearly illustrate the end gates and the full back gate.
FIG. 4 is a cross sectional view taken on the line 4—4 of FIG. 3 showing all end gates closed for utilizing this mold in forming the maximum number of treads and risers for which it is designed.
Figure 5:
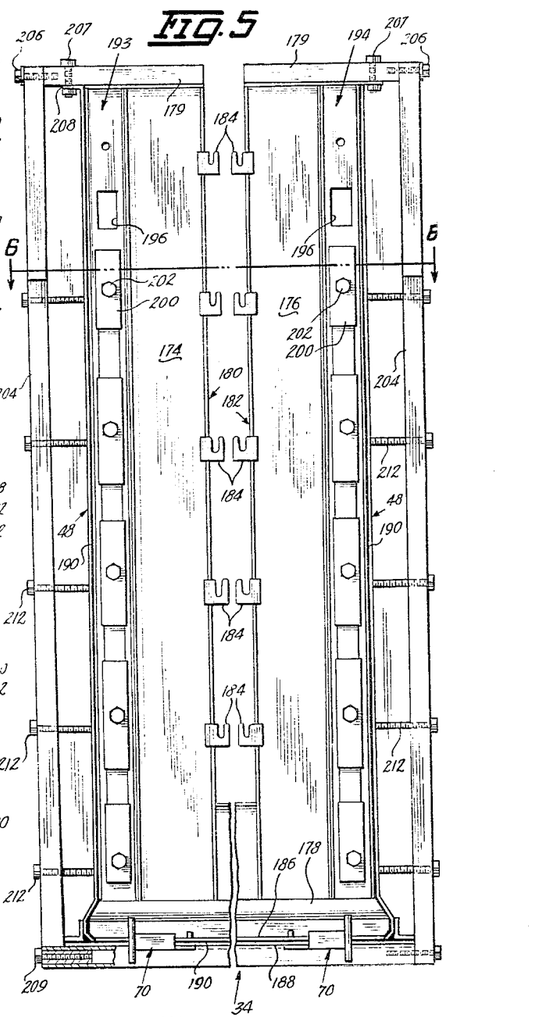
FIG. 5 is an elevational view similar to FIG. 3 but showing the back gate removed for a stair unit having an open back, and also showing the upper opposed end gates opened whereby the number of treads and risers are reduced by one from the maximum for which the mold is designed.
Figure 6:
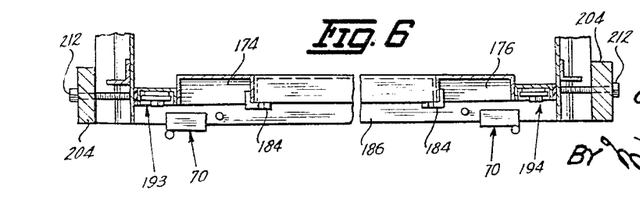
FIG. 6 is a cross sectional view taken on the line 6—6 of FIG. 5.

Referring to the drawings, this new mold 24 as seen generally in FIGS. 1 and 2 for example, comprises the basic component parts of an outer shell 26 (FIG. 7), an inner core 28 (FIG. 8), side plates 30 (FIG. 11), a bottom plate 32 (FIG. 11) with the designation "bottom" having reference to the position of plate 32 when the concrete is poured, and end gates 34 as best seen in FIGS. 3 and 5. These components which will be referred to later in more detail are required in the casting of a flight of stairs alone which have no platform or back wall, and for use in supplementing these basic components for additional stair structure as may be desired, I provide one or more platform inner cores 36 as seen in FIG. 9 and a full back gate 38 as best seen in FIG. 2.

Figure 7:
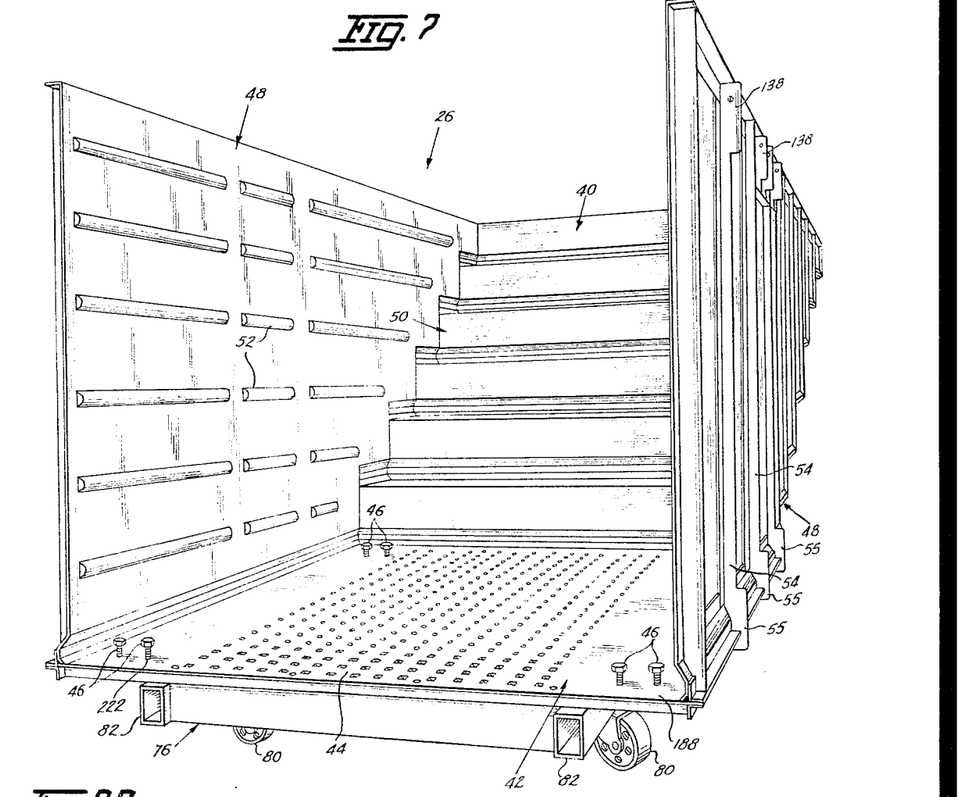
FIG. 7 is an enlarged perspective rear view of the dolly mounted complete outer shell shown in the position in which it is used in the pouring of the cement.
Figures 8, 9:
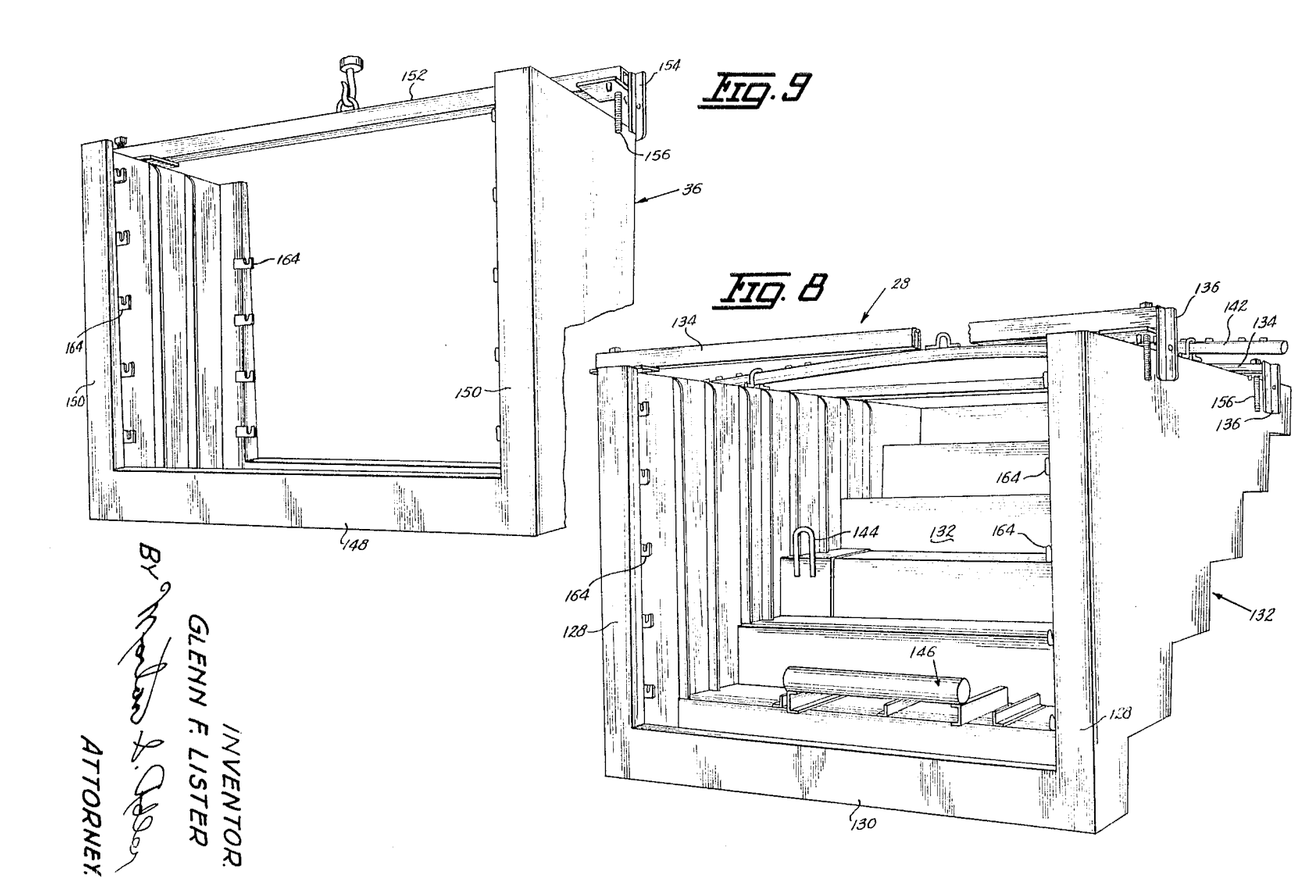
FIG. 8 is a perspective view of the inner core which is used in cooperation with the stepped portion of the outer shell shown in FIG. 7.
FIG. 9 is a perspective view of one of the platform inserts for use with the platform portion of the outer shell.

Referring now more particularly to FIG. 7, the complete outer shell 26 represents one of the important improvements which has made the casting of concrete steps considerably more efficient than has heretofore been possible by other methods presently in use. Shell 26, as well as the other parts to be described, is preferably made of sheet steel and includes the integral stepped portion 40 and platform portion 42. Portion 40 is designed to form six treads and six risers and portion 42 is designed for a maximum platform of sixty inches since such limits are generally satisfactory for substantially all maximum stairs and platforms for which this mold 24 is intended. Being integrally formed, portions 40 and 42 contain no seams and consequently no parts to be assembled or disassembled as has heretofore been required and therefore eliminate many of the problems and disadvantages mentioned earlier. Portion 42 may be smooth or roughened 44 in any suitable manner, if desired. The bolts and nuts 46 shown are well known whereby the bolts are withdrawn after the casting to leave the nut as an anchor for a railing, if desired, and no invention is claimed in this feature.

Figure 15:
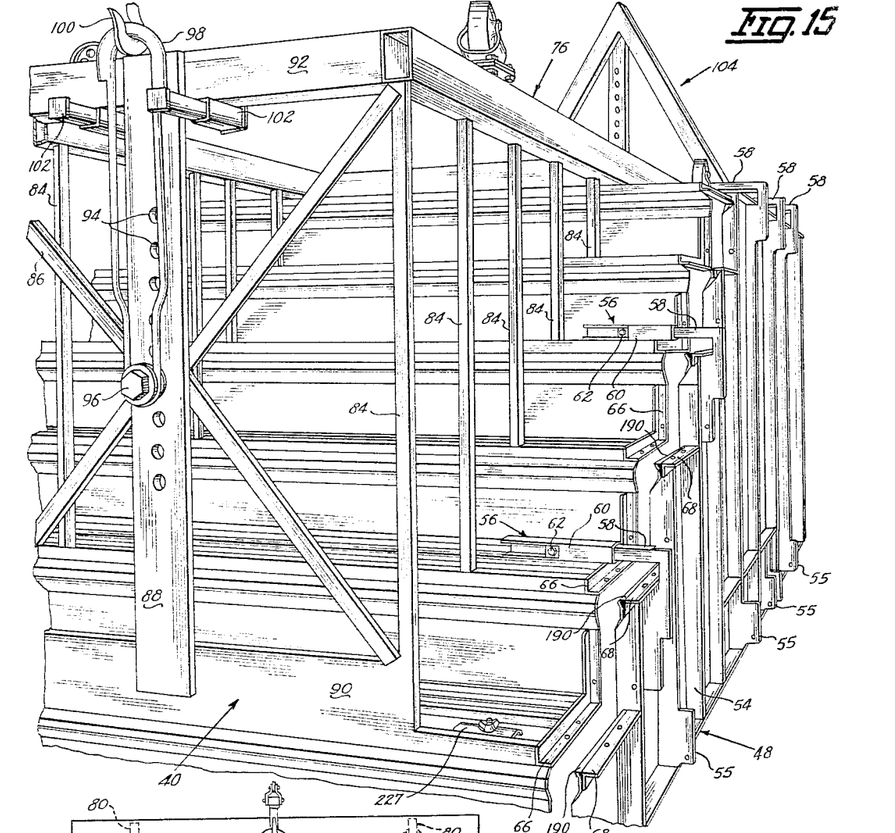
FIG. 15 is an enlarged perspective front view of this mold showing it inverted relative to the position in FIG. 14 and also showing one of the sides of the outer shell moved outwardly in preparation for the removal of the mold from the casting.

The sides 48 for the outer shell 26 are each a unitary part being formed from either a single sheet or welded sections or otherwise and include a stepped end 40 so that such sides 48 are complementary to portions 40 and 42 as seen in FIG. 7. The ribs 52 on the inner sides sides of sides 48 serve merely to provide a design feature of the finished steps and are immaterial to this invention. The outer sides of the sides 48 are provided with a plurality of parallel spaced vertical angle iron stiffeners 54 which some contain apertured flanges 55 at the bottom for use as will become apparent. As best seen in FIG. 15, each side 48 is attached to the outside of portions 40 and 42 by a series of telescopic slide assemblies 56 which include a slide member shown as a bar 58 welded to the side 48 and slidable in a respective complementary slide receiving member such as casing or housing 60 welded on portions 40 and 42. A step 62 on bar 58 engages casing 60 (FIG. 15) to limit the movement of side 48 away from portions 40 and 42. Slide assemblies 56 are mounted on the outside of selected steps and on the outside of the platform, the designation "outside" having reference to the mold surfacse not in contact with the concrete. Sides 48 are maintained in proper alignment with portions 40 and 42 by slide assemblies 56. The purpose of slide assemblies 56 is to permit sides 48 to be moved away from the casting at the proper time and without having to remove the sides 48 entirely as required in other forms of molds. To secure sides 48 to portions 40 and 42 for forming the stairs 64 (FIG. 16), the outside of the steps are provided with vertical and horizontal apertured flanges 66 and mating apertured flanges 68 are provided on the edges of sides 48. Similar arrangements are used between portion 42 and stiffners 54. Thus arranged, when sides 48 are abutting the portions 40 and 42, the apertures in the various mating flanges are in register and while bolts and nuts can be used to secure them together and are commonly used for such purposes, I prefer to use the fastening clamp 70 (FIG. 22) which includes a pin 72 to pass through the apertures and a channel body 74 to frictionally embrace the abutting flanges. Such a clamp 70 is simple, easy and quick to apply or remove and saves considerable time. Thus far described, it will be appreciated that while sides 48 are movable relative to portions 40 and 42, they are and remain attached thereto so no assembly or disassembly of parts as heretofore known is necessary. Sides 48 are thus always in proper alignment with their related parts.

Another improved feature of the outer shell 26 is the fact that it is permanently mounted to a dolly means 76 that supports mold 24 in its normal position for receiving the poured concrete which is the inverted position for the finished steps as seen in FIGS. 1 and 2. Dolly 76 comprises an enlarged rectangular frame mounted on caster wheels 80 and includes the spaced hollow elongated side members or rails 82 which are welded to the outer side of portion 42 and rigidly connected to the outer side of portion 40 by the stepped brace bars 84 which are welded to both portion 40 and rails 82 as best seen in FIG. 1. It is not uncommon to use dollies for supporting and moving molds of this type but heretofore they have been separate detached pieces of equipment which necessitates the use of hoists for mounting and demounting the mold thereon. By permanently attaching the dolly as described, the mold can be easily and quickly moved about and wear and tear and damage to the dolly is eliminated for all practical purposes.

Mold 24 as seen in FIGS. 1 and 2 must be inverted for removal from the casting as will later be referred to in more detail and for this purpose at the forward end of dolly 76 (FIG. 1) a pair of diagonally crossed braces 86 are welded to the endmost brace bars 84 and a vertically disposed bar 88 is welded at approximately its longitudinal center to the intersection portion of braces 86. The top of bar 88 is welded to a crosbar 90 connecting the endmost brace bars 84 and the bottom of bar 88 is similarly attached to the cross bar 92 connected the forward ends of frame rails 82. Bar 88 is provided with a plurality of longitudinally spaced holes 94 for selectively receiving a suitable bearing member 96 to which there is applied an elongated suspension loop 98 designed to be engaged by a hook 100 on a hoist means (not shown) on the bottom cross bar 92 at each side of bar 88 are the respective telescopically extensible stops 102 having the retracted position shown in solid lines and the extended position shown in broken lines. The purpose of steps 102 will be described in the operation of removing the mold from the casting.

Figure 16:
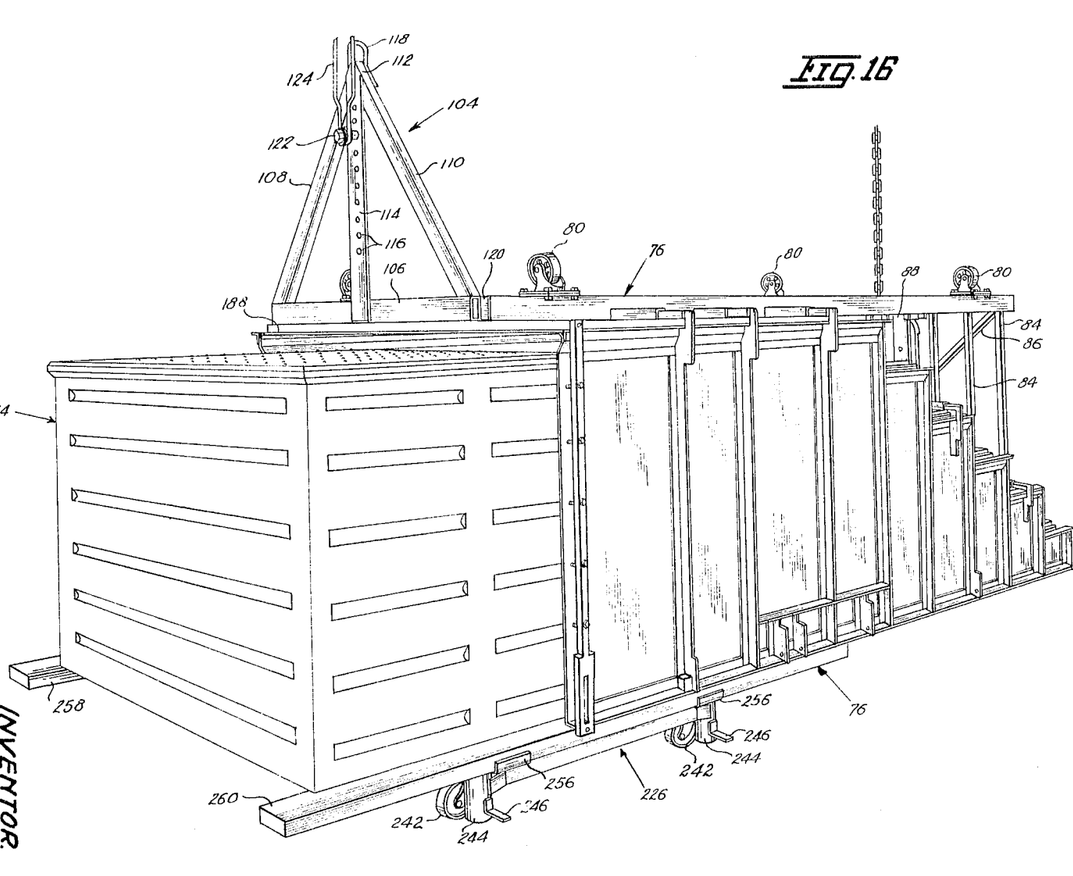
FIG. 16 is a perspective view illustrating the outer shell being removed in one piece from the cast steps.

At the rear of dolly 76 (FIG. 2), I use a triangular lifting frame 104 having the wide base 106 from the responsive ends of which the arms 108 and 110 converge to the apex end 112. A vertical bar 114, having spaced holes 116, is welded between base 106 and the apex end 112. A loop 118 is secured to end 112 as shown. From opposite ends of base 106 parallel slide bars 120 extend which are removably and telescopically mounted into the respective hollow ends of rails 82 as illustrated for one of such bars in FIG. 2. By this arrangement, frame 104 can be removed from rails 84 from its position shown in FIG. 2 and remounted thereto in inverted position as seen in FIG. 16 for reasons that will later be explained. Bar 114 is used with a bearing member 122 and suspension loop 124 similarly to that on the front end as described and which will be engaged by the hook 126 on a hoist (not shown).

Figures 11, 12:
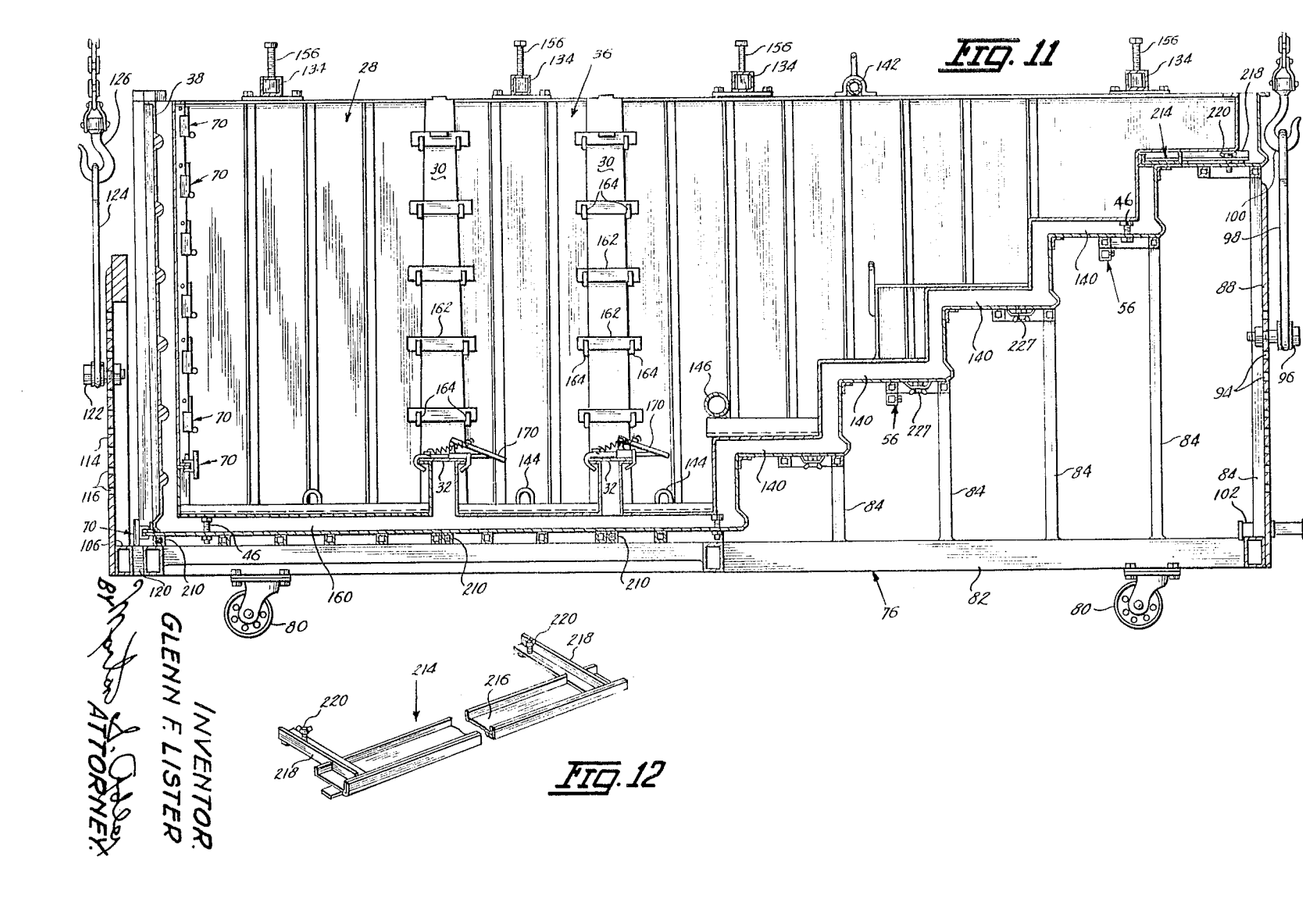
FIG. 11 is a longitudinal sectional view of the mold shown in FIG. 12.
FIG. 12 is a perspective view of the cut-off plate used in reducing the number of treads and risers from the maximum for which the mold is designed.
Figure 14:
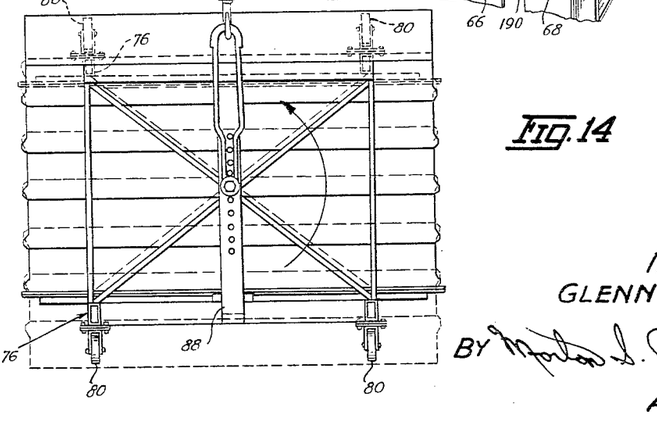
FIG. 14 is a reduced front elevational view of this mold showing its position when the concrete is poured.

With reference now to FIGS. 8 and 9, there is shown the inner step core 28 which is the mating part of this mold for portion 40 of the outer shell 26. Core 28 is an integral piece of a general hollow box-like construction with sides 128 and a top 130 formed into the stepped portion 132 as shown, it being understood that the terms "top" and "bottom" as may be used with cores 28 and 36 and shell 28 have reference to the top and bottom of the finished steps 64. Spaced parallel mounting bars 134 are suitably secured across the bottom of core sides 128 so as to project outwardly therefrom and terminate in downwardly extending apertured locking flanges 136 which mate with selective like flanges 138 on sides 48 of shell 26. Flanges 138 are so located that core 28 will be positioned to provide the pouring cavity 140 as seen in FIG. 11. Intermediate bars 134 is a lifting bar 142 suitably secured to core 28 as seen in FIG. 11. The inner portion of core 28 is provided with lifting hooks 144 on a lower plane than bar 142 and also with a mount means 146 for any suitable vibrating mechanism (not shown).

Figure 22:
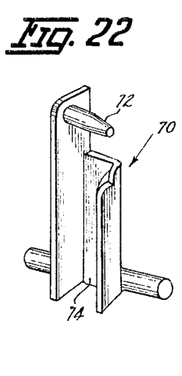
FIG. 22 is an enlarged perspective view of one of the friction clamps used with various of the mold components.

The platform insert 36 of which there may be more than one of different widths to provide any platform size within the limits of portion 42 of the outer shell, includes the top 148 and opposed sides 150 with a combined mounting and lifting bar 152 across the free ends of sides 150 as seen in FIG. 9. Bar 152 also includes flangess 154 for mounting to the outer shell 26 the same as flanges 136. Units 28 and 36 when arranged relative to shell 26 are locked in place at the several mating points by the clamp means 70 (FIG. 22). It will, of course, be understood that units 28 and 36 are moved by hoist means engaged with the respective lifting bars. The like bolts 156 on bars 134 and 152 (FIGS. 8 and 9) abut the lips 138 (FIG. 7) on shell 26 and are operative in removing these units as will later appear. Such platform inserts when used, provide the cavity 160 which is a continuation of cavity 140 as seen in FIG. 11. Platform 36 does not abut core 28 nor does two platform units abut each other but rather a fixed spacing is provided by the position of the mating flanges described and such spacing is closed and further maintanied by the side plates 30 (FIG. 11) which contain spaced transverse bars 162 to engage the hooks 164 as seen in FIGS. 8, 9 and 11. These plates create an additional cavity 166 communicating with cavity 168 between the sidewalls of the shell 26, inner core 28 and platform inserts 36 that will form a reinforcing rib for the finished steps and such rib will be continued across the underside of the platform section of the finished steps by use of plates 32 which are held in place by the spring clamps 170. The use of inner core 28 and the platform 36 as described is well known and while no invention is claimed in such parts per se, their cooperation with the improved outer shell 26 provides decided improvements and advantages over other molds of this class.

From the description so far, it will be appreciated that the outer shell 26 can be utilized without any assembly or disassembly relative thereto for a set of stairs alone using only the inner core 28 or for a set of stairs with one or more platform sections 36. Whatever arrangement of these units is desired, it is necessary to provide a mold closure for the back end and for this purpose I have made some important improvements in the end closure represented by the gate 34 for an open rear end stair structure and the gate 38 for a closed rear end stair structure (FIGS. 3–5) to which reference is now made.

The end gate assembly utilizes either the full back gate 38 (FIG. 2) which produces a closed back end on the casting as seen in FIG. 16 with the inset panel 172 or gate 34 for an open back end (FIG. 5) in which panel 172 would not be present. These are merely a matter of choice depending upon where the steps will be used. If the back end is against a building, it may be desired to leave the back open and sometimes when the back is not against a building, the back may be left open for use as a storage area in which case a door (not shown) may even be provided.

With the inner core (FIG. 8) mounted in the outer shell 26 (FIG. 7) as described to set up this mold for the tread and riser portion of the stair structure, it will be appreciated from the foregoing that the casting can be of the tread and riser portion only, or with one or more platform sections 36 (FIG. 9). It no platform section is desired, or only one, for example, it is necessary to mount either the end gae 34 (FIGS. 3–5 ) or back gate 38 (FIG. 2) within the outer shell 26 since less than the maximum capacity of the outer shell is being used. It the full capacity of the outer shell is used, the gates 36 and 38 are mounted to the end of the outer shell 26 as seen in FIG. 2. In this regard, the construction of such gates and their mounting means are important improvements of this invention and will now be described in detail.

Referring more particularly to FIG. 5, the end gate 34 which is the rear end mold closure for what I have referred to as the open end step structure, is an integral piece, U shaped of flat bar material having the upstanding arms 174 and 176 and the bottom cross piece 178. Across the free ends of arms 174 and 176 as seen at the top of FIG. 5 are the bar members 179. The respective opposed edges 180 and 182 are provided with spaced hooks 184 corresponding in location with the hooks 164 on the inner core 28 and platform sections as shown in FIGS. 8 and 9. Thus, if end gate 34 is used with the inner core 28 alone, arms 174 and 176 and cross piece 178 would be aligned respectively with the sides 128 and member 130 of the inner core 28. Arms 174 and 176 would be connected in spaced relationship to sides 128 by the side plates 30 (FIG. 11) and piece 178 would be similarly connected to member 130 by the plate 32 and clamps 170. If a platform section 36 is used, it is connected to the inner core in this same manner and likewise, gate 34 would then be connected to the platform section by the same procedure. When the full capacity of the outer shell 26 is used by employing sufficient platform sections to fill the entire core, the lower portion of the cross piece 178 includes an apertured flange 186 (FIG. 5) which mates with the apertured flange 188 on portion 42 of the outer shell 26 as seen in FIGS. 5 and 7. Clamp means 70 are used to secure such mating flanges together and a suitable gasket means or seal 190 is preferably used between such flanges and also between sidewalls 48 and portions 40 and 42 as seen in FIG. 15. It no platform section is used or only one is used so that gate 34 is within the confines of the outer shell 26, I use one or more bars 191 (FIG. 23) which is apertured at one end for atachment to flange 188 by a clamp 70 and contains a nipple 192 for nesting in one of the apertures of flange 186. Such bars 191 thus adequately secure the cross piece 178 within the outer shell 26.

With end gate 34 installed as described, it is pointed out as seen in FIG. 5 that the respective outer portions of arms 174 and 176 define the respective panel sections 193 and 194. Each of these panels is provided with the vertically spaced openings 196 so that each such opening is planar with one of the tread portions of the outer shell and in communication with the sidewall casting cavity 168. A T shaped plug 198 as best seen in FIG. 4 is removably inserted into holes 196 so that is overlaps the hole at the top and bottom and a holding plate 200 is used to secure such plugs in place by a threaded bolt 202. Plates 200 are so arranged that each one secures the lower overlapping portions of the T plug above and the upper overlapping portion of the T plug below. This provides a secure plug means against the pressure of the concrete when poured and permits the easy opening of any hole 196 by the removal of the plugs as seen in FIG. 5 where the open holes shown would be provided for a stair structure for five steps, for example, which is one less than the maximum capacity for the outer shell 26. The open holes 196 aid in determining the proper level of concrete for the number of steps desired and also provide access to the casting cavity for the insertion and use of an elongated cement smoothing tool (not shown). Since the top step in the final stairs will be at the bottom of the end gate 34 as viewed in FIG. 5, the appropriate plug 198 to remove is determined by counting upwardly to the number of steps to be cast. Heretofore, end gate sections have been composed of individually attached parts, each representing one riser space and it has been necessary to disassemble such parts to the level desired. With gate 34 which is an integral element, it is now only necessary to remove the selected corresponding plugs 198 on each arm 174 and 176.

Figure 23:
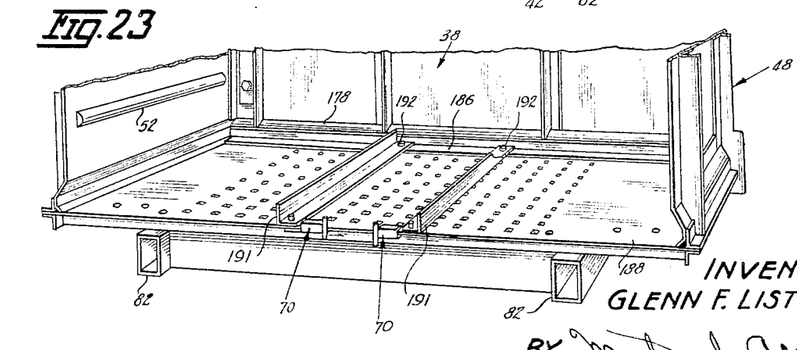
FIG. 23 is a fragmentary perspective view of the rear end of the outer shell showing the rear end closure mounted therein when the final casting will have less platform area than the maximum for which the outer shell is designed.

A further improvement in relation to the end gate 34 is the use of bars 204 which are affixed to the outer sides of the respective sides 48 at whichever point the gate 34 may be located. Bars 204 are of like construction so that a description of one will be sufficient and like parts will be given like numerals. The purpose of bars 204 is to stiffen sides 48 and keep them from bulging under the weight and pressure of the poured concrete so that the sides of the casting will not have a bowed surface. Bars 204 extend the height of sides 48 and are secured by a horizontal bolt 206 to the bear 179 and by the vertical bolt 207 into the flange 208 on gate 34 as seen in FIG. 5. At the bottom of gate 34 as shown (which is actually the outer side of the platform portion 42) bars 204 are secured by bolt means 209 into suitably spaced tapped tubes 210 which can also be seen in FIG. 11. Each bar 204 includes spaced bolts 212 that are tightened into abutting contact with the outer surface of sides 48 to provide a vertical line of stiffening support as best seen in FIG. 5. Such bars 204 are attachable as described at any position where gate 34 is used. Gate 38 (FIG. 2) for the closed stair rear has like components as gate 34 for mounting in or to the outer shell 26 and thus like parts have been given like numerals. The bars 191 in FIG. 23 are used both with gates 34 and 38 when necessary.

Another of the innovations in this invention is the cut-off plate 214 which is shown particularly in FIG. 12 and includes the channel bar 216 having the parallel transverse projecting fastening bars 218. Plate 214 is used when a lesser number of steps are desired in the finished casting than the maximum number for which the outer shell 26 is designed. Plate 214, when used, is mounted to the selected step when the outer shell 26 is open as seen in FIG. 7 and this is done by placing the channel bar portion 216 in overlapping projecting position to the edge of the desired step so that it covers the casting cavity 140 as best seen in FIG. 11. Fastening bars 218 are then secured to the step by a bolt means 220 through suitable holes 222. Such holes 222 are provided at each side of each step and may be used for anchoring a nut 46 (FIG. 11) or plugged by a fitting 227. The purpose of nut 46 is to provide an anchoring means on an appropriate step, when desired, for ornamental railings (not shown) that are commonly used with steps of this type. Since such railings are not anchored to every step, and since this mold is adaptable for different numbers of steps, holes 222 are provided on all steps of the mold for use when desired or needed.

Figures 17, 18, 19, 20, 21:
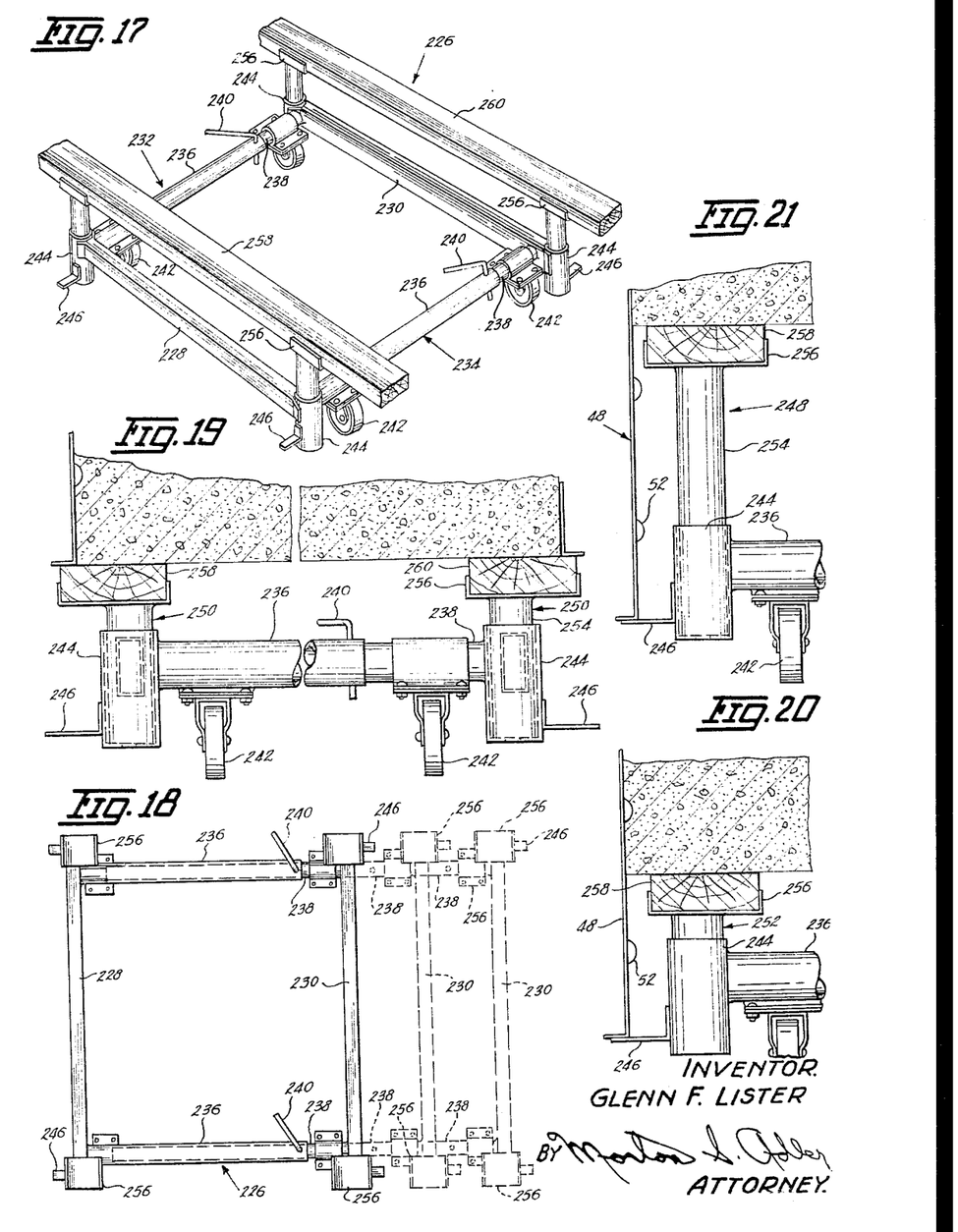
FIG. 17 is a perspective view of the improved dolly used in the removal of the outer shell as also seen in FIG. 16.
FIG. 18 is a top view of the dolly shown in FIG. 17 with the broken lines illustrating different positions of adjustment for castings with different numbers of treads and risers.
FIG. 19 is an enlarged elevational end view showing the use of the dolly in FIG. 17 preparatory to removing the outer shell.
FIGS. 20 and 21 are fragmentary elevational views similar to FIG. 19 but showing dolly adjustments for stairs with different numbers of treads and risers.

With reference now to FIGS. 17 and 21, I show my improved adjustable dolly 226 which is used in the removal of the mold from the casting 64 as shown in FIG. 16. Dolly 226 comprises a rectangular frame including the parallel side rails 228 and 230 connected at corresponding ends by the longitudinally extensible tubular assemblies 232 and 234. Such assemblies comprise the tubular member 234 and the telescopically arranged rod or tube 238 whereby the width of dolly 226 may be widened or narrowed in the obvious manner shown and locked in any selected position by the removable pins 240. In this regard, different adjustable positions of the dolly for width are illustrated in FIG. 18 where the solid line position or narrowest width is adapted for use with a mold 24, for example, designed for a maximum of four steps. The dotted line positions from left to right are for five and six step maximum size molds respectively. This adjustability permits use of dolly 226 with a wide range of mold sizes having varying overall widths as may be required in the trade. Caster wheels 242 are mounted to tubes 236 and 238 in a well known manner. At each corner of the frame for dolly 226 there is mounted the vertically disposed tubular standard 244 whose bottom ends are suspended above the floor level on which wheels 242 will travel as best seen in FIG. 19. Projecting outwardly from each standard 244 is the bracket 246. Standards 244 are designed to removably receive and support any one of the support members 248, 250 and 252 which are of like construction except for vertical size and which are respectively used in removing castings for four, five or six steps as will be referred to when the operation of this mold is described. Supports 248, 250 comprise the vertical support rods or pipes 254 adapted to nest in standards 244 at their bottom ends and at their respective top ends they each carry the channel bracket 256 on which planks 258 and 260 are arranged as best seen in FIG. 17. Supports 250 for five steps and 252 for six steps have the same length support rods 254 and it will be noted that such rods are off center relative to channel brackets 256 whereby when they are rotated (FIGS. 12 and 20) they are differently located for the appropriate steps. Note in FIG. 19 the position of channel 256 under the edge of the outer shell with bracket 246 not in use and in FIG. 20 with channel 256 differently positioned, it is within the outer shell for a five step structure and bracket 246 engages the outer shell edge. The foregoing mold 24 when constructed as described, will be used in the following manner.

*Operation*

The position of the outer shell 26 for casting the stair structure is shown in FIG. 7 where it is supported on the dolly 76. Such dolly is an integral part of the outer shell structure as seen in FIG. 1 and this arrangement provides greater efficiency in the handling of the entire structure.

The inner core 28 is then mounted within the outer shell 26 as described which provides the casting cavity 140 for the several steps and risers as can be seen in FIG. 11. If no platform section is desired in the step structure, the end gate 34 or the back gate 38, whichever is desired, is then mounted within the outer shell 26 according to the manner previously described. If one or more platform sections are desired they are mounted within the outer shell and gate 34 or 38 is then attached to the rear of the outer shell. In this regard, as seen in FIG. 23, the back gate 38 can be suitably mounted inside of the outer shell if less than the maximum platform capacity of the outer shell is being used. By utilizing the bar members 191, the back gate 38 is rigidly secured at the bottom and along the sides by the bar assemblies 204 and their related parts.

One of the features of this mold 24 is the fact that it is designed for a maximum number of treads and risers which, as illustrated, is six in number, since such a number of treads and risers will generally suffice for most situations. However, it is possible with this new mold to utilize less than the maximum capacity of the outer shell and for this purpose, as seen in FIG. 11, for example, the cut-off plate 214 is inserted to provide a stair structure of only five steps and risers. Correspondingly, as seen in FIGS. 3–5, the panels 193 and 194 in the end gates 34 and back gate 38 are provided with vertically spaced openings 196 which are closeable by plugs 198. Each of these openings is on a plane with one of the steps in the mold so that when less than the maximum number of steps is being used, a corresponding gate is open so that the level of the cement in the platform section will be planar with the bottom step. These two features, namely, that of cutting off the use of one of the step molds and of providing the opening in the end closures are of a material improvement over other molds of this type.

Figure 10:
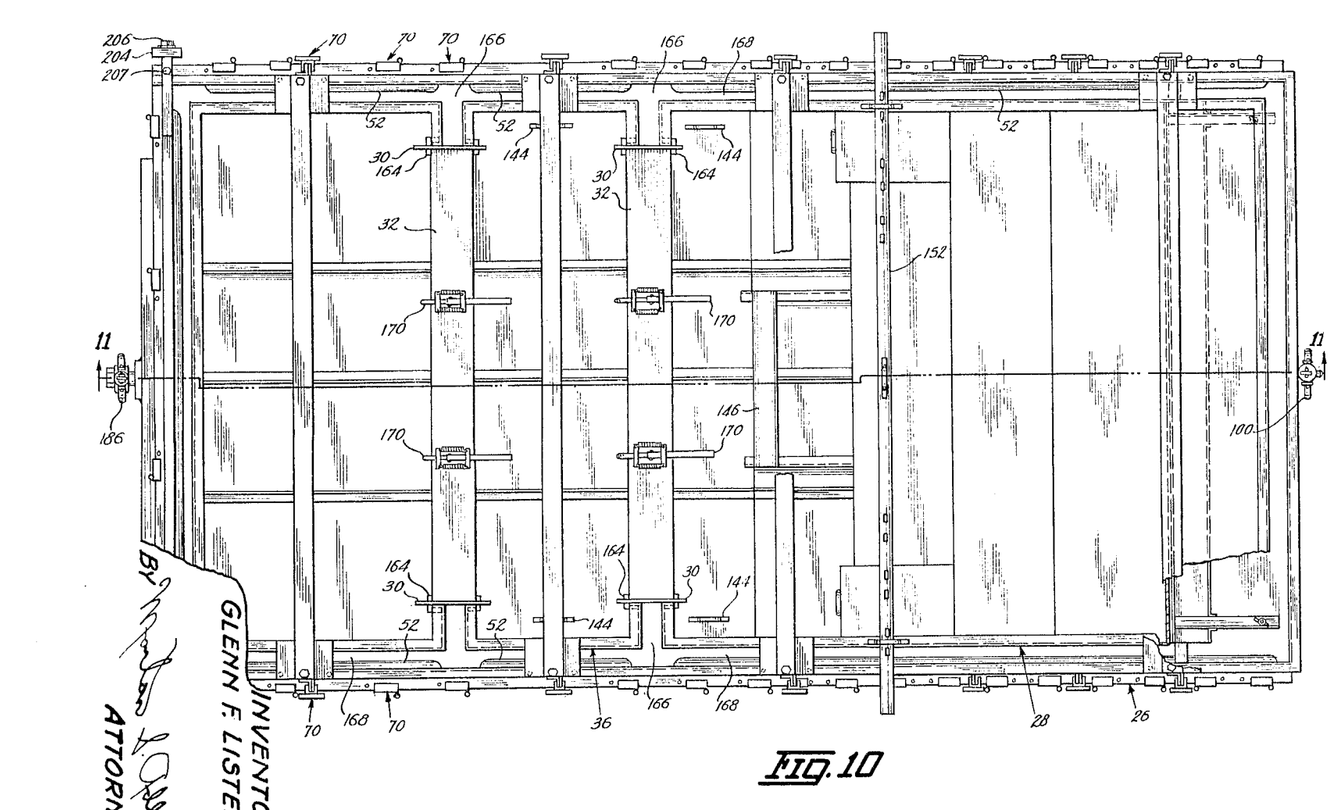
FIG. 10 is a top plan view of the assembled mold.

It will be understood that before the inner core and platform sections and rear closures are mounted as indicated that the respective sides 48 will be in abutting position with the edges of the outer shell by slidable movement on the slide assemblies 56 which are shown in FIG. 15. Also, the mounting bars 134 (FIG. 8) and 152 (FIG. 9) are secured as described at their end portions by the clamp means 70 and such clamps are also used to secure sides 48 to the outer shell 26 as can be best seen in FIGS. 1 and 2. With the mold thus assembled, the cement is introduced into the cavity 168 as seen in FIG. 10 and by the use of a suitable vibrating mechanism of which many types are available, the casting cavity as seen in FIGS. 10 and 11 is filled to the proper height.

When the casting is ready to be removed, the mold 24 will be in the position shown in FIGS. 1 and 2. It is first necessary to remove the inner core 28 and any platform sections 36 and the end closures 34 and 38. The order in which these are removed is not material. In removing the inner core or the platform section the bolts 156 are rotated clockwise so that they bear against the lip 158 on the respective sides 48. This provides a sufficient lifting force against the inner core or the platform section to move it slightly upwardly enough to break it loose from the casting. At this point, the inner core 28 can then be suitably lifted out of the outer shell by any hoist means engageable with the lifting bar 142 and the platform sections can be similarly lifted out by a hoist means as shown in FIG. 9. Thus with the inner core and any platform sections and the end gates removed, there remains only the complete outer shell about the casting which must be removed.

It will be understood, of course, that before any parts which are secured by clamp 70 are removed that such clamps will first be removed and in preparing the outer shell for removal from the casting, all of the clamps 70 which are utilized will first be removed. At this point, the loops 98 on the frame assembly at the front of the outer shell and loop 124 on the frame assembly at the rear of the outer shell are engaged by a suitable lifting hoist and elevated above floor level. The bearings 96 and 122 can be appropriately positioned in any of the respective holes 94 or 116 so that a perfect balance of this outer shell is easily obtained while in suspension. In this position, the form as seen in FIGS. 1 and 2 can be easily manually rotated about its longitudinal axis with the purpose being of rotating the frame 180° to position the mold for the removal of the outer shell. During this operation, stop means are provided to limit the rotation of the outer shell to 180° and this is provided by the stops 102 which are shown in FIG. 1. If the rotation is counterclockwise for example, stop 102 shown on the left in FIG. 1 is retracted and the stop 102 on the right is extended so that loop 98 will engage the extended stop at the appropriate point to stop the rotation. Once the outer shell has been rotated 180°, both stops 102 can be extended to prevent any rotation in either direction as illustrated in FIG. 15.

When the rotation of the outer shell as described above has been completed, to 180° position, the adjustable dolly 226 (FIG. 17) is placed in position below the inverted outer shell as illustrated in FIG. 16. Dolly 226 is adjustable as described for outer shells having respective widths of four, five and six feet and as shown in FIG. 16, an outer shell with a six foot width is used. The planks 258 and 260 will be positioned to support the casting and, according to the number of steps in the finished casting that has been determined, one or the other of support members 248, 250 and 252 are used in the standards 244. For a structure with six treads and risers, the use of dolly 226 is shown in FIG. 19 and for a four or five riser unit, the same is illustrated in FIGS. 21 and 20. With dolly 226 in place, the outer shell is lowered onto such dolly to be supported thereby.

At this point, the sides 48 provide one of the important novel features of this invention. Such sides 48 are movable on the slide assembly 56 as seen in FIG. 15 sufficiently to break such sides loose from the casting. I may be necessary in this operation to insert a wedge or lever means between flanges 66 and the corresponding flanges of sides 48 and in any event, the distance of movement of sides 48 are limited by the stop 62 on the slide assembly 56. When this is done it will be appreciated that sides 48 are effectively separated from the casting but at the same time are not detached from the outer shell 28. Such assemblies 56 keep the sides 48 in proper alignment with the outer shell portions 40 and 42 and thus it is wholly unnecessary to completely disassemble the sides and the outer shell as has heretofore been the practice in this art. The frame structure at the rear of the dolly is then inverted as shown in FIG. 16 and a this point, the outer shell including the attached side 48 can be easily slid off of the casting from the front o step end of the casting.

Once the outer shell is removed, the advantages of sides 48 being still mounted thereto is apparent since such sides can be re-postiioned for a succeeding casting with a minimum of time and work. Being already properly aligned, it is only necessary to move slide assemblies 4 on the slides 56 and re-insert the clamps 70.

From the foregoing it is thought a full understanding of the construction and operation of this invention wi be had and the advantages of the same will be appre ciated.

It will be understood that the phraseology employe herein is for the purpose of description and not fc limitation and that modifications and changes in th construction and arrangement of this invention can t made within the scope of what is claimed, without depar ing from the spirit and purpose thereof. It is thu intended to cover by the claims, any modified forn of structure or mechanical equivalents which may t reasonably included within their scope.

I claim:
1. A mold for precasting a monolithic concrete sta structure, comprising:
  a one piece seamless outer shell having a stepped po tion and a platform portion,
  opposed sides on said outer shell,
  a removable end closure on said outer shell,
  an inner core complementary to said stepped portio
  means for removably mounting said inner core to sa outer shell to form a casting cavity,
  each of said opposed sides being respective integr units,
  each slide assembly including a slide member on o of said opposed sides and a complementary slide ceiving member on said outer shell,
  slide assemblies connecting each of said opposed sid to respective sides of said outer shell, said opposed sides being operatively attached to said outer shell but movable away therefrom by said slide assemblies a sufficient distance to become loosened from said casting, and said slide means serving to maintain said opposed sides in parallel alignment with said outer shell when they are moved towards said outer shell for a succeeding casting, and upon removal of said closure and said inner core after a casting, means for removing said outer shell and opposed sides as a unit from the casting.

2. A mold as defined in claim 1 including:

said outer shell and opposed sides being designed to form a predetermined maximum number of threads and risers and a predetermined maximum length platform, and means mounting said end closure within said outer shell relative to said inner core to exclude the use of said platform portion in any casting.

3. A device as defined in claim 1 including:

means carried by said inner core and cooperating with said opposed sides to move said inner core a relatively short distance parallel to said opposed side after the casting has set for the purpose of loosening said inner core from said casting and thus expedite the removal of said inner cores from said outer shell.

4. A mold as defined in claim 1 including:

said outer shell and opposed sides being designed to form a predetermined maximum length platform, and means mountable to said outer shell to utilize less than its maximum capacity so as to form a stair structure of a selective number of treads and risers less than the maximum for which said outer shell is designed.

5. A mold as defined in claim 1 including:

a dolly means integral with said outer shell for supporting the same in inverted position, and suspension members longitudinally spaced on said dolly means designed to be engaged by a lifting force whereby said outer shell can be accurately balanced while suspended above floor level and can be easily manually rotated about its longitudinal axis.

6. A mold as defined in claim 1 wherein:

said outer shell has a front and rear end, frame means on said respective front and rear ends, and suspension means on each frame designed to be engaged by a lifting force whereby said outer shell can be accurately balanced while suspended above floor level and can be easily manually rotated about its longitudinal axis.

7. Apparatus as defined in claim 6 wherein:

said outer shell is rotatable selectively clockwise and counterclockwise, and means on one of said frames to limit rotation of said outer shell with said means being adjustable for effective use irrespective of the direction of rotation of said outer shell.

8. A mold for precasting a monolithic concrete stair structure, comprising:

a one piece seamless outer shell having a stepped portion and a platform portion, opposed sides on said outer shell a removable end closure on said outer shell, an inner core complementary to said stepped portion, means for removably mounting said inner core to said outer shell to form a casting cavity, said outer shell and opposed sides being designed to form a predetermined maximum number of treads and risers and a predetermined maximum length platform, means for closing said casting cavity at any selected stepped portion intermediate said stepped portion and said inner core to reduce the number of steps in the finished casting below the maximum number for which said outer shell is designed, a plurality of openable gates on said end closure each in communication with said casting cavity and each being planar with one of the steps in said stepped portion, with said casting cavity being closed at a selected step, the gate corresponding to the level of said step is opened to prevent the rise of the poured concrete in said casting cavity above said selected step, and upon removal of said closure and said inner core after a casting, means for removing said outer shell and opposed sides as a unit from the casting.

9. A mold for precasting a monolithic concrete stair structure, comprising:

a one piece seamless outer shell having a stepped portion and a platform portion, opposed sides on said outer shell, a removable end closure on said outer shell, a inner core complementary to said stepped portion, means for removably mounting said inner core to said outer shell to form a casting cavity, said outer shell and opposed sides being designed to form a predetermined maximum number of treads and risers and a predetermined maximum length platform, a plurality of platform inserts which individually are of lesser dimension than the maximum platform length afforded by said platform portion and which when used together are equal to said maximum length, said platform inserts being selectively removably mounted in said outer shell individually and together, means selectively mounting said end closure within said outer shell relative to an individual platform insert when used and to the end of said outer shell relative to all of said platform inserts when used, and upon removal of said closure and said inner core after a casting, means for removing said outer shell and opposed sides as a unit from the casting.

10. A mold for precasting a monolithic concrete stair structure, comprising:

a one piece seamless outer shell having a stepped portion and a platform portion, opposed sides on said outer shell, a removable end closure on said outer shell, an inner core complementary to said stepped portion, means for removably mounting said inner core to said outer shell to form a casting cavity, said outer shell and opposed sides being designed to form a predetermined maximum number of treads and risers and a predetermined maximum length platform, means mountable to said outer shell to utilize less than its maximum capacity so as to form a stair structure of a selective number of treads and risers less than the maximum for which said outer shell is designed, said stair structure being cast in inverted position, means for removing said inner core from said outer shell while the step structure is inverted, means for turning the step structure to upright position with said outer shell attached thereto, dolly means for supporting said structure in upright position, said dolly means including adjustable supports for selectively supporting a step structure with the maximum number of treads and risers and for supporting a step structure with a number of treads and risers less than the maximum for which said outer shell is designed, and upon removal of said closure and said inner core after a casting, means for removing said outer shell and opposed sides as a unit from the casting.

(References on following page)

References Cited by the Examiner

UNITED STATES PATENTS

| | | | |
|---|---|---|---|
| 968,316 | 8/1910 | Beckert | 280—79.1 |
| 2,289,439 | 7/1942 | Kogl | 25—118 |
| 2,331,701 | 10/1943 | Kogl | 25—118 |
| 2,353,676 | 7/1944 | Kogl | 25—118 |
| 2,592,578 | 4/1952 | Kogl | 25—118 |
| 2,633,620 | 4/1953 | Kogl | 25—118 |
| 2,705,825 | 4/1955 | Dartez et al. | 249—14 |
| 2,903,777 | 9/1959 | Mitchell | 25—130 |
| 3,126,605 | 3/1964 | Davis | 25—118 |
| 3,212,155 | 10/1965 | Francis | 249—14 |

J. SPENCER OVERHOLSER, *Primary Examiner.*

R. D. BALDWIN, *Examiner.*

UNITED STATES PATENT OFFICE
CERTIFICATE OF CORRECTION

Patent No. 3,281,110                      October 25, 1966

Glenn F. Lister

It is hereby certified that error appears in the above numbered patent requiring correction and that the said Letters Patent should read as corrected below.

Column 1, line 34, for "and" read -- an --; column 10, between lines 70 and 71, insert -- a plurality of slide assemblies --.

Signed and sealed this 5th day of September 1967.

SEAL)
Attest:

ERNEST W. SWIDER
Attesting Officer

EDWARD J. BRENNER
Commissioner of Patents